United States Patent
Yang et al.

(10) Patent No.: US 12,370,962 B2
(45) Date of Patent: Jul. 29, 2025

(54) SOUND ABSORPTION AND LOAD BEARING INTEGRATED STRUCTURE AND PREPARATION METHOD THEREOF

(71) Applicant: Tongji University, Shanghai (CN)

(72) Inventors: Fan Yang, Shanghai (CN); Zhengmiao Guo, Shanghai (CN); Jinfeng Zhao, Shanghai (CN); Pengfei Li, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 0 days.

(21) Appl. No.: 18/166,847

(22) PCT Filed: Sep. 28, 2022

(86) PCT No.: PCT/CN2022/122037
§ 371 (c)(1),
(2) Date: Feb. 9, 2023

(87) PCT Pub. No.: WO2023/193412
PCT Pub. Date: Oct. 12, 2023

(65) Prior Publication Data
US 2024/0308441 A1    Sep. 19, 2024

(30) Foreign Application Priority Data
Apr. 7, 2022   (CN) .......................... 202210361589.2

(51) Int. Cl.
*B60R 13/08*   (2006.01)
*G10K 11/172*   (2006.01)

(52) U.S. Cl.
CPC ............ *B60R 13/08* (2013.01); *G10K 11/172* (2013.01)

(58) Field of Classification Search
CPC .... B60R 13/08; G10K 11/172; G10K 11/162; Y02P 10/25
(Continued)

(56) References Cited

U.S. PATENT DOCUMENTS

| | | | |
|---|---|---|---|
| 2,595,047 A * | 4/1952 | Beranck ................. | G10K 11/16 181/286 |
| 9,353,909 B2 * | 5/2016 | Ramaska ............... | B62D 21/15 |

(Continued)

FOREIGN PATENT DOCUMENTS

| | | | | |
|---|---|---|---|---|
| CN | 101373591 B | * | 6/2011 | |
| CN | 109441983 B | * | 5/2021 | ................ F16F 7/00 |

(Continued)

OTHER PUBLICATIONS

Machine translation of CN_101373591_B (Year: 2011).*

(Continued)

*Primary Examiner* — Dedei K Hammond
*Assistant Examiner* — Jennifer B. Olson
(74) *Attorney, Agent, or Firm* — MH2 Technology Law Group, LLP (57) ABSTRACT

Disclosed is a sound absorption and load bearing integrated structure and a preparation method thereof. The sound absorption and load bearing integrated structure comprises of a first connecting node and a holed hollow rod connected to the first connecting node. The first connecting node is of a solid structure, and the connecting portion of the first connecting node and the holed hollow rod is in smooth transition by means of a cambered surface. The first connecting node and the holed hollow rod form a sound absorption unit. The holed hollow rod of one sound absorption unit extends forwards from an axial direction of the first connecting node, and extends to be connected to a first connecting node of another sound absorption unit, or (Continued)

extends to be intersected with a holed hollow rod of another sound absorption unit so as to form a second connecting node.

9 Claims, 6 Drawing Sheets

(58) Field of Classification Search
USPC ......... 181/285, 286, 288; 156/290; 428/138, 428/189
See application file for complete search history.

(56) References Cited

U.S. PATENT DOCUMENTS

| | | | |
|---|---|---|---|
| 9,546,660 B2* | 1/2017 | Lucas | F04C 29/065 |
| 10,295,309 B2* | 5/2019 | Loukus | B32B 15/04 |
| 11,358,223 B2* | 6/2022 | Song | B33Y 80/00 |
| 2021/0358468 A1* | 11/2021 | Lee | G10K 11/172 |

FOREIGN PATENT DOCUMENTS

| | | | | | |
|---|---|---|---|---|---|
| CN | 112848553 A | * | 5/2021 | ............... | B22F 3/00 |
| JP | 2006072129 A | * | 3/2006 | | |

OTHER PUBLICATIONS

Machine translation of CN_109441983_B (Year: 2021).*
Machine translation of CN_112848553_A (Year: 2021).*
Machine translation of JP2006072129A (Year: 2006).*

* cited by examiner

SOUND ABSORPTION AND LOAD BEARING INTEGRATED STRUCTURE AND PREPARATION METHOD THEREOF

CROSS-REFERENCE TO RELATED APPLICATION

This patent application claims the benefit and priority of Chinese Patent Application No. 202210361589.2, filed with the China National Intellectual Property Administration on Apr. 7, 2022, the disclosure of which is incorporated by reference herein in its entirety as part of the present application.

TECHNICAL FIELD

The present disclosure relates to the field of multi-functional hollow lattice metamaterials, in particular relates to a sound absorption and load bearing integrated structure and a preparation method thereof.

BACKGROUND

The development of means of delivery typified by vehicles, aircrafts and spacecrafts has put increasingly high requirements on the mechanical properties of structures. In addition to traditional load bearing performance requirements such as stiffness and strength, weight and energy absorption performance are two particularly important indicators.

In the traditional structural design, different functional modules are separated from one another. That is, a part of material is configured to satisfy the load bearing performance requirement of the structure, a part of the material is configured to satisfy anti-collision energy absorption requirements, and the other part of the material is configured to satisfy the requirements of heat insulation, vibration isolation, noise reduction or electronic shielding. Such design idea is not conducive to achieving the light weight of the means of delivery vehicles. To meet the development of aircrafts, spacecrafts, automobiles and other means of delivery vehicles, it is necessary to develop a new lightweight material satisfying a variety of functional requirements at the same time, thus achieving the integration of anti-collision energy absorption and lightweight functional structure.

SUMMARY

To solve the shortcomings in the prior art, the present disclosure provides a sound absorption and load bearing integrated structure and a preparation method thereof.

To achieve the objective above, the present disclosure is achieved through the following technical solution:

In accordance with one aspect of the present disclosure, a sound absorption and load bearing integrated structure is provided, which comprises a first connecting node and a holed hollow rod connected to the first connecting node. The first connecting node is of a solid structure, and the connecting portion of the first connecting node and the holed hollow rod is in smooth transition through a cambered surface.

The first connecting node and the holed hollow rod form a sound absorption unit. The holed hollow rod of one sound absorption unit extends forwards from an axial direction of the first connecting node, and extends to be connected to a first connecting node of another sound absorption unit, or extends to be intersected with a holed hollow rod of another sound absorption unit to form a second connecting node.

The number of the holed hollow rods connected to the second connecting node is not greater than that of the holed hollow rods connected to the first connecting node. Specifically, the number of the holed hollow rods connected to the second connecting node is smaller than that of the holed hollow rods connected to the first connecting node at the boundary of the sound absorption and load bearing integrated structure, and is equal to that of the holed hollow rods connected to the first connecting node at the center of the sound absorption and load bearing integrated structure.

The holed hollow rod comprises a rod body, a cavity is formed in the rod body, the rod body is provided with a through hole communicating with the cavity, and the through hole forms a Helmholtz resonant cavity.

Compared with the prior art, the present disclosure has the beneficial effects that the solidification of the first connecting node and the second connecting node can effectively prevent the hollow lattice from breaking at the first connecting node and enhance the load bearing capacity of a bending-oriented hollow lattice structure. The through hole may form a Helmholtz resonant cavity with the cavity, which has excellent sound absorption and noise reduction performance, and thus the multifunctional lattice structure metamaterial integrating mechanics and acoustics is achieved.

A hybrid hollow lattice is constructed by combining the hollow rods with the first solid connecting node and the second solid connecting node to improve the load bearing performance of the structure. A through hole is formed in each hollow rod to form the Helmholtz resonant cavity to generate excellent sound absorption performance, thereby achieving the load bearing-sound absorption multifunctional lattice structure metamaterial design. The sound absorption and load bearing integrated structure has the advantages of being simple in preparation, strong in reliability, adjustable in configuration, and wide applicable range.

The cavity of the hollow rod forms a Helmholtz resonant cavity with the through hole, thus forming the common local resonance effect in acoustic metamaterials. When a system is subjected to sound waves, the air in the through hole and the air in the cavity form a co-vibration system, and thus a one-dimensional vibration system composed of effective mass of air in the through hole and elasticity of air in the cavity has a resonance phenomenon for the action of sound waves, with the resonance frequency of $$f_0 = \frac{c}{2\pi}\sqrt{\frac{S}{(l+0.8d)V}},$$

in the formula, $f_0$ is the resonance frequency of a Helmholtz resonator, c is the sound velocity, l and d are the length and diameter of the through hole, S is the cross-sectional area of the through hole, and V is the volume of the cavity. Resonance occurs when the acting sound wave frequency is the same as the system resonance frequency. The resonant cavity may convert the sound energy into internal energy, which plays a role of sound absorption.

Further, every two of the holed hollow rods connected to the first connecting node and the second connecting node are intersected at an angle of 70.53°, the first connecting node and the holed hollow rod connected to the first connecting node form a body-centered cubic cell, and the connecting portions of the first connecting node, the second connecting node and the holed hollow rods are in smooth transition by means of cambered surfaces.

By adopting the further technical solution above, the beneficial effects are that the solid connecting node and the middle hollow rod are in smooth transition, the cross-section shape from the middle of the rod piece to the node is in gradual transition by means of the cavity, thus the sudden change of the cross section can be avoided, the stress concentration can be effectively reduced, and the load bearing capacity is favorably improved.

Further, one side, away from the first connecting node, of the second connecting node located on the boundary of the sound absorption and load bearing integrated structure is provided with a lead angle.

By adopting the further technical solution above, the beneficial effects are that the stress concentration caused by sudden change of the cross section is further avoided, and the load bearing capacity is improved.

Further, the cavity comprises of a cylinder cavity, the two ends of the cylindrical cavity are connected to hemispherical cavities or hemi-elliptical cavities.

By adopting the further technical solution above, the beneficial effects are that a capsule-shaped cavity is formed in the middle of each rod, the curvature of the cambered surface can be adjusted by adjusting the hemi-major axis and the hemi-minor axis of the cavity, thus effectively reducing the stress concentration. Preferably, the two ends of the cylindrical cavity are connected to the hemi-elliptical cavities, the first solid connecting node and the middle hollow rod are in smooth transition, and the cross section shape from the middle of the rod piece to the first connecting node is in gradual transition by means of the cavity, a capsule-shaped cavity is formed in the middle of each rod, the curvature of the cambered surface can be adjusted by adjusting the hemi-major axis and the hemi-minor axis of the cavity, thus effectively reducing the stress concentration.

Further, the rod body is cylindrical, and the rod body has a diameter of 2 to 6 mm and a length of 10 to 18 mm.

Further, the through hole is formed in the middle of the cavity, and the through hole is a round hole and has a diameter of 0.2 to 1 mm.

Further, the body-centered cubic cell comprises of eight holed hollow rods connected to the same first connecting node.

Further, the first connecting node forms a periodic structure with the holed hollow rods connected to the first connecting node.

By adopting the further technical solution above, the beneficial effects are that the periodic structure material consisting of the first connecting node and the rod pieces connected to the first connecting node is different from traditional porous materials such as foams and grids. The periodic structure is a three-dimensional ordered lattice structure, the middle portion of a connecting rod is hollow while the first connecting node is solid, such that the strength and stiffness of the hollow lattice at the first connecting node are strengthened.

Further, the periodic structure is a centrosymmetric structure or an axisymmetric structure, and the outermost body-centered cubic cell is provided with holed hollow rods which are not connected to other body-centered cubic cells.

When the periodic structure is the centrosymmetric structure, the holed hollow rods not connected to the other body-centered cubic cells extend to a direction away from the symmetric center.

When the periodic structure is the axisymmetric structure, the holed hollow rods not connected to the other body-centered cubic cells are located on the symmetric axis. By adopting the further technical solution, the beneficial effects are that the sound absorption and load bearing integrated structure can be widely used in aircrafts, spacecrafts, automobiles and other means of delivery vehicles without affecting the strength and stiffness of the sound absorption and load bearing integrated structure at the node.

In accordance with another aspect of the present disclosure, a preparation method of a sound absorption and load bearing integrated structure is provided, comprising the following steps: firstly, laying a layer of powder, and melting or sintering, by a laser beam, the powder according to preset geometric shape;

after the powder is solidified, covering the solidified part with the next layer of powder according to the preset geometric shape, and then performing laser melting or sintering;

accumulating and forming layer by layer to prepare the sound absorption and load bearing integrated structure, where the air in the through hole forms a co-vibration system with the air in the cavity, and a one-dimensional vibration system composed of effective mass of air in the through hole and elasticity of air in the cavity is formed, and thus has a resonance phenomenon for the action of sound waves, with the resonance frequency of $$f_0 = \frac{c}{2\pi} \sqrt{\frac{S}{(l + 0.8d)V}},$$

in the formula, $f_0$ is the resonance frequency of the Helmholtz resonator, c is the sound velocity, l and d are the length and diameter of the through hole, S is the cross-sectional area of the through hole, and V is the volume of the cavity.

According to the manufactured sound absorption and load bearing integrated structure, a Helmholtz resonant cavity is introduced into the body-centered cubic lattice. Preferably, a cavity comprises of a cylindrical cavity, and the two ends of the cylindrical cavity are connected to hemispherical cavities or hemi-elliptical cavities to form capsule-shaped hollow cavities. The capsule-shaped hollow cavities and the reserved first solid connecting node are used for enhancing the load bearing capacity of the hollow lattice structure while achieving light weight, and excellent sound absorption and noise reduction performance is achieved by additionally forming through hole in the hollow cavity, thus forming the mechanical-acoustic multifunctional integrated metamaterial structure design technical solution.

In the drawings: 1—rod body; 11—cavity; 12—through hole; 2—sound absorption unit; 21—first connecting node; 22—second connecting node; 3—sound absorption and load bearing integrated structure.

DETAILED DESCRIPTION OF THE EMBODIMENTS

The present disclosure is further described with reference to the accompanying drawings and specific embodiments. It should be understood that these embodiments are only used to illustrate the present disclosure rather than limiting the scope of the present disclosure. In addition, it should be understood that after reading the content disclosed by the present disclosure, various changes or modifications may be made by those skilled in art, and these equivalent forms also fall within the scope as defined by the appended claims of the present disclosure.

Embodiment I

The embodiment provides a holed hollow rod. The hollow rod comprises a rod body 1, the rod body 1 is cylindrical, and has a diameter of 2 to 6 mm and a length of 10 to 18 mm. A cavity 11 is formed in the rod body 1, the rod body 1 is provided with a through hole 12 communicating with the cavity 11. The through hole 12 forms a Helmholtz resonant cavity with the cavity 11. The cavity 11 comprises a cylindrical cavity, the two ends of the cylindrical cavity are connected to hemispherical cavities or hemi-elliptical cavities. Preferably, the through hole 12 is located in the middle of the cavity 11, the through hole 12 is a round hole and has a diameter of 0.2 to 1 mm.

Figure 1A:
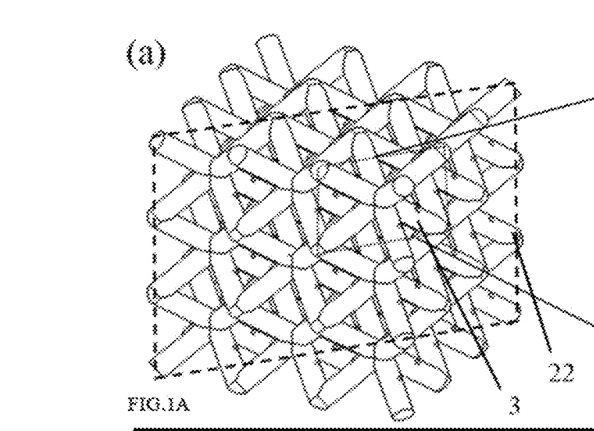
FIG. 1A-F are schematic diagrams of a sound absorption and load bearing integrated structure, (a) to (c) are sequentially enlarged structural configurations showing structural units of all levels; (d) to (f) are cross-sectional views corresponding to (a) to (c), respectively, where the cross-sectional positions are shown by dotted lines in (a) to (c)
Figure 1B:
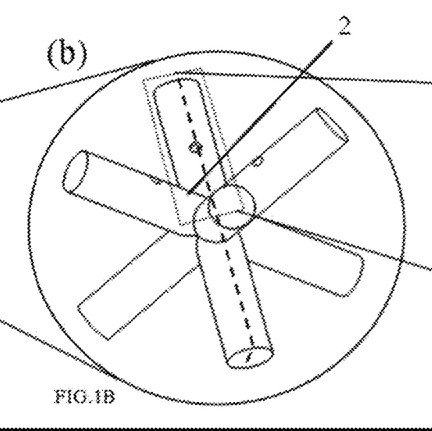
Figure 1C:
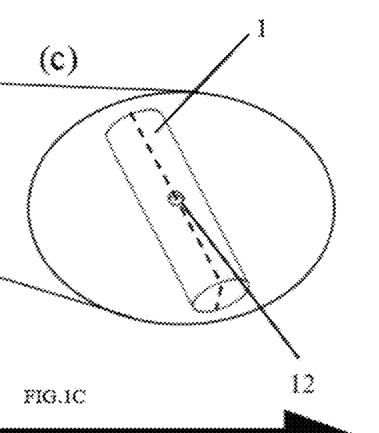
Figure 1D:
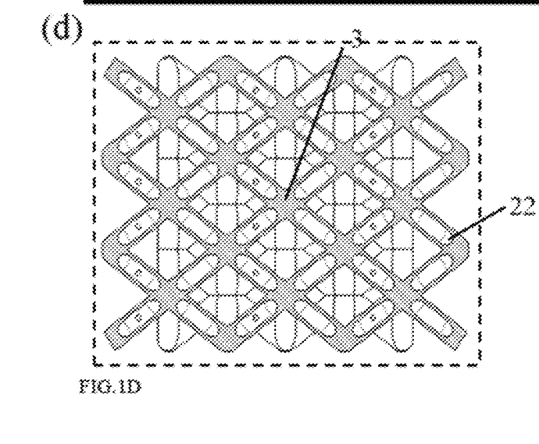
Figure 1E:
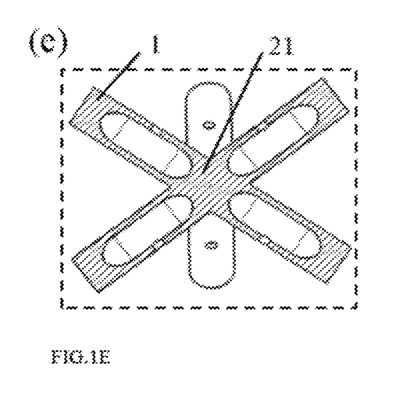
Figure 1F:
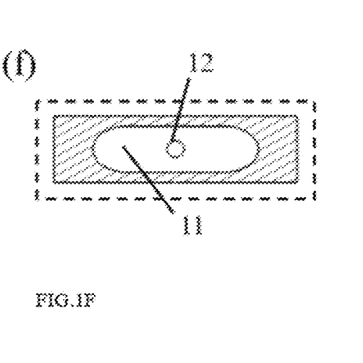
Figure 2:
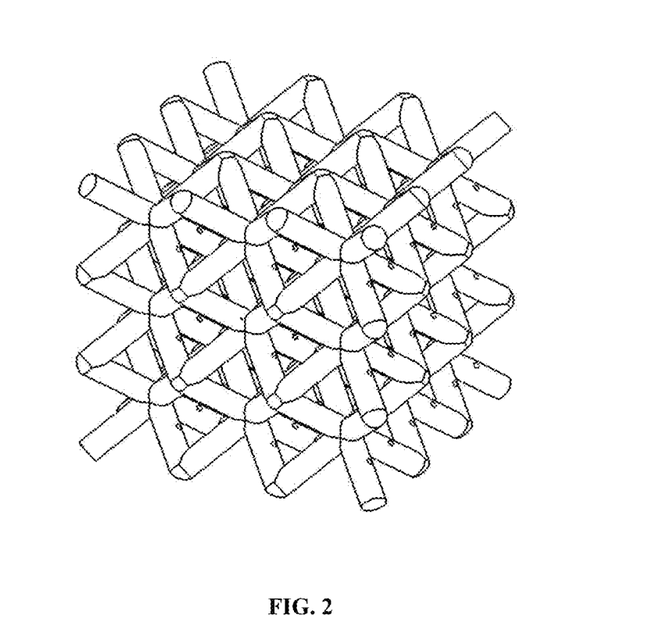
FIG. 2 is a schematic diagram of a sound absorption and load bearing integrated structure of an embodiment I.

In accordance with the embodiment, a sound absorption and load bearing integrated structure 3 manufactured using the holed hollow rod above is provided, which comprises of a first connecting node 21 and the holed hollow rod connected to the first connecting node 21. The first connecting node 21 and the holed hollow rod form a sound absorption unit 2. The holed hollow rod of one sound absorption unit 2 extends forwards from an axial direction of the first connecting node 21, and extends to be connected to a first connecting node 21 of another sound absorption unit 2, or extends to be intersected with a holed hollow rod of another sound absorption unit 2 to form a second connecting node 22. The number of the holed hollow rods connected to the second connecting node 22 is not greater than that of the holed hollow rods connected to the first connecting node 21. Every two of the holed hollow rods connected to the first connecting node 21 and the second connecting node 22 are intersected at an angle of 70.53°. The first connecting node 21 and the second connecting node 22 are of solid structure, the connecting portions of the first connecting node 21, the second connecting node 22 and the holed hollow rods are in smooth transition by means of cambered surfaces, and the first connecting node 21 and the holed hollow rods connected to the first connecting node 21 form a body-centered cubic cell. One side, away from the first connecting node 21, of the second connecting node 22 located on the boundary of the sound absorption and load bearing integrated structure 3 is provided with a lead angle. The body-centered cubic cell comprises of eight holed hollow rods connected to the same first connecting node 21. The first connecting node 21 forms a periodic structure with the holed hollow rods connected to the first connecting node 21, the periodic structure is a centrosymmetric structure or an axisymmetric structure, and the outermost body-centered cubic cell is provided with holed hollow rods which are not connected to other body-centered cubic cells. When the periodic structure is the centrosymmetric structure, the holed hollow rods not connected to the other body-centered cubic cells extend to a direction away from the symmetric center. When the periodic structure is the axisymmetric structure, the holed hollow rods not connected to the other body-centered cubic cells are located on the symmetric axis. As shown in FIGS. 1B and 1E, as an implementation mode, the body-centered cubic cell comprises of eight holed hollow rod bodies 1 connected to the same first connecting node 21. The first connecting node 21 and the rod bodies 1 form a plurality of body-centered cubic cells and form the periodic structure. The body-centered cubic lattice is a basic lattice material topological configuration, and the cells thereof are formed by connecting cubic body diagonal lines. As shown in FIGS. 1A and 1D, a 3×3×3 array is formed by 27 body-centered cubic (BCC) cells. Due to the fact that the number of Maxcell of the BCC is smaller than 0, the BBC lattice is a typical bending-dominated lattice. Each cell comprises of eight holed hollow rods, and the whole structure contains 216 holed hollow rods. The end part of each holed hollow rod is a solid cross section, the middle is a hollow cross section, and a through hole 12 is formed in the middle of the hollow rod, such that the through holes 12 forms a Helmholtz resonant cavity with the cavity 11. The whole structure contains 216 Helmholtz resonant cavities. Preferably, the through hole 12 is round, and the holed hollow rod is cylindrical. The diameter of the through hole 12 is much smaller than that of the holed hollow rod, thus reducing the weakening of the load bearing capacity of the structure as much as possible. Parameters such as the slenderness ratio of the holed hollow rod, the rod wall thickness, the diameter of the through hole 12, the proportion of the first solid connecting node 21 and a transition curvature between the first solid connecting node 21 and the hollow rod can all be adjusted as required, thus achieving the optimal load bearing-energy absorption comprehensive performance. The connecting number of the first connecting nodes 21 in the lattice structure is Z, Z>12 and Z<12 respectively correspond to a tension-compression-dominated lattice structure and a bending-dominated lattice structure. In the tension-compression-dominated material, the first connecting node 21 and the second connecting node 22 are restrained more, a stress direction of the rod piece is mainly in the axial direction, and large compression force can be generated, thus the tension-compression-dominated material is generally used as a load bearing structure. While in the bending-dominated material, the first connecting node 21 and the second connecting node 22 are less restrained, the first connecting node 21 tends to bend as a plastic hinge, the force response of the structure is small, but a long and stable yield platform is provided, thus the bending-dominated material is generally used as an energy absorption structure. By introducing the hollow configuration into the bending-dominated lattice structure, it is expected to obtain a lattice material with both high specific strength and high specific energy absorption. For example, for a working occasion with more emphasis on load bearing, the tension-compression-dominated lattice configuration can be adopted, and a larger solid ratio of the first connecting node 21 to the second connecting node 22 (i.e., a shorter length of the cavity 11) is adopted. For a working occasion with more emphasis on sound absorption, the body-dominated cubic lattice can be adopted, and a larger hollow rod diameter and a smaller solid ratio of the first connecting node 21 to the second connecting node 22 (i.e., a longer length of the cavity 11) are adopted.

In accordance with the embodiment, a preparation method of a sound absorption and load bearing integrated structure is provided, comprising the following steps:

step one, establishing a geometric model for a sound absorption and load bearing integrated structure 3;

step two, evaluating the positions of a cavity 11 and a through hole 12, evaluating whether the specific energy absorption, specific strength and specific stiffness are in line with expectations or not by a preset method and pre-printing; if the specific energy absorption, specific strength and specific stiffness are in line with the expectations, performing step three; if the specific energy absorption, specific strength and specific stiffness are not in line with the expectations, changing the rod diameter and rod length of the holed hollow rod and geometric parameters of the through hole 12 and the cavity 11, and then evaluating whether the specific energy absorption, specific strength and specific stiffness are in line with the expectations by the preset method and pre-printing until the specific energy absorption, specific strength and specific stiffness are in line with the expectations, and performing the step three;

step three, laying a layer of powder, and melting or sintering, by a laser beam, the powder according to a preset geometric shape;

step four, after the powder is solidified, covering the next layer of powder over the solidified portion according to the preset geometric shape, and then performing laser melting or sintering;

step five, accumulating and forming layer by layer to prepare the sound absorption and load bearing integrated structure 3, where the air in the through hole forms a co-vibration system with the air in the cavity, and a one-dimensional vibration system composed of effective mass of air in the through hole and elasticity of air in the cavity is formed, and thus has a resonance phenomenon for the action of sound waves, with the resonance frequency of $$f_0 = \frac{c}{2\pi} \sqrt{\frac{S}{(l+0.8d)V}},$$

in the formula, $f_0$ is the resonance frequency of the Helmholtz resonator, c is the sound velocity, l and d are the length and diameter of the through hole, S is the cross-sectional area of the through hole, and V is the volume of the cavity. The manufactured sound absorption and load bearing integrated structure 3 is superior to the traditional BCC structure in terms of specific energy absorption, specific strength and specific stiffness, specifically as shown in the following Table:

| Lattice Structure | Cavity Wall Thickness/mm | Mass/g | Apparent Density (kg/m³) | Specific Energy Absorption (J/g) | Specific Stiffness (J/g) | Specific Strength (J/g) |
|---|---|---|---|---|---|---|
| Traditional Solid BCC | | 157 | 1117 | 9.9 | 783.3 | 14.2 |
| | | 179 | 1273 | 10.9 | 782.4 | 15.9 |
| | | 197 | 1401 | 11.1 | 856.9 | 16.9 |
| | | 209 | 1486 | 11.4 | 858.5 | 17.6 |
| BBC with cavity | 0.6 | 154 | 1167 | 10.1 | 1050.8 | 18.1 |
| | 0.8 | 177 | 1334 | 11.4 | 1083.3 | 19.4 |
| | 1.0 | 195 | 1461 | 12.1 | 1018.8 | 20.3 |
| | 1.2 | 205 | 1527 | 11.8 | 1262.9 | 20.1 |

Figure 3:
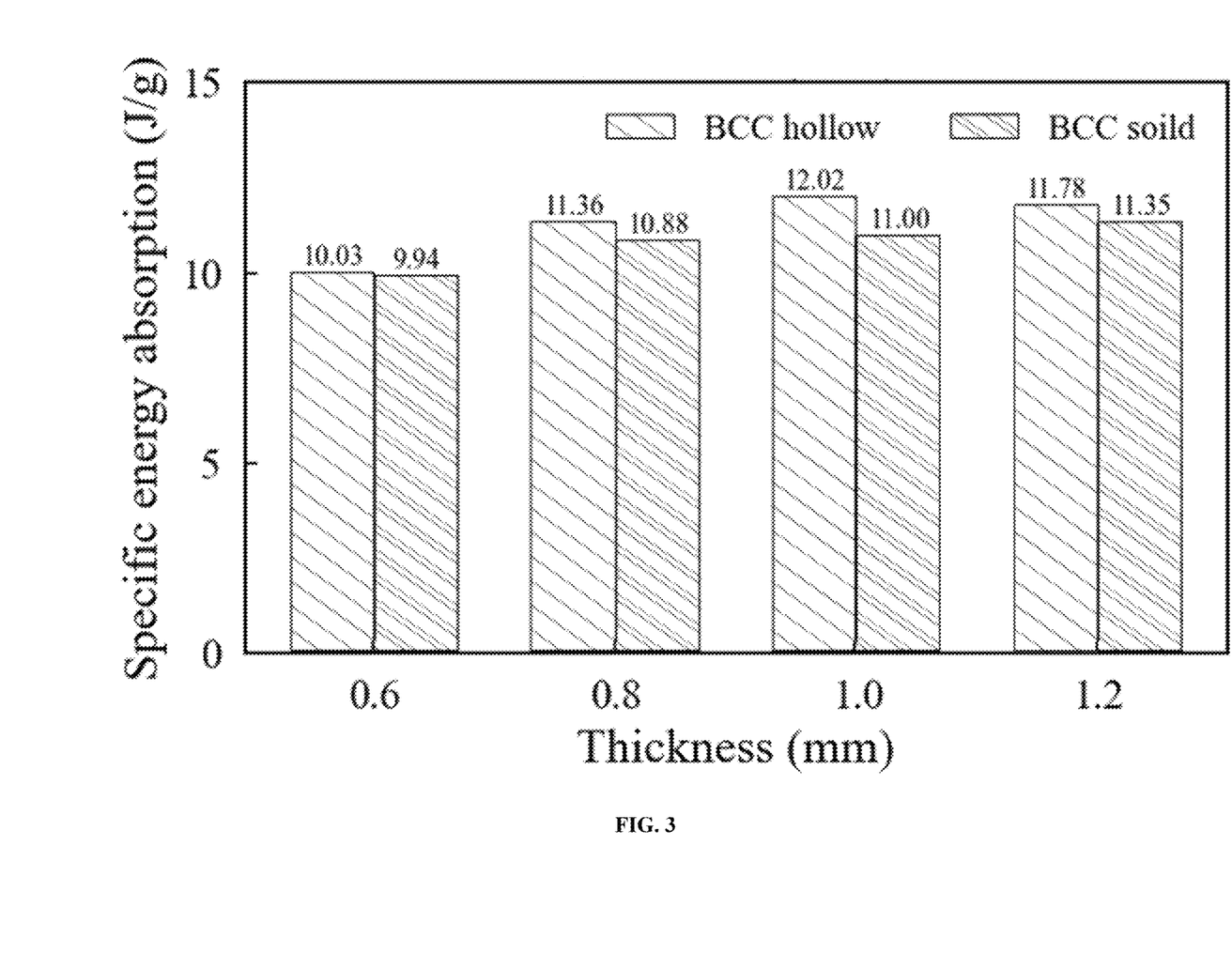
FIG. 3 is a specific energy absorption comparison diagram of several cavity lattice materials with different wall thicknesses and traditional solid lattice materials with similar densities.
Figure 4:
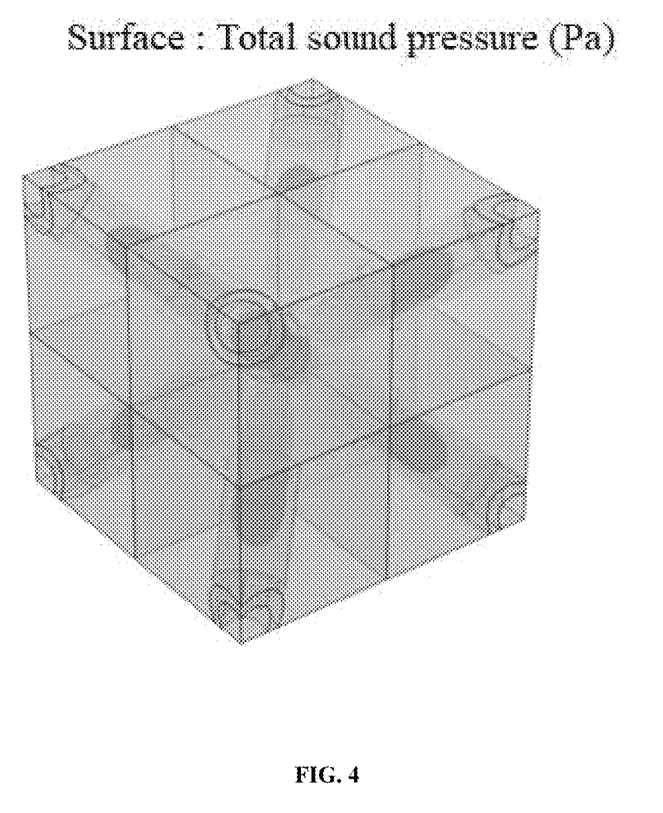
FIG. 4 is a surface sound pressure distribution diagram of sound absorption simulation of a BCC cell with a cavity.
Figure 5:
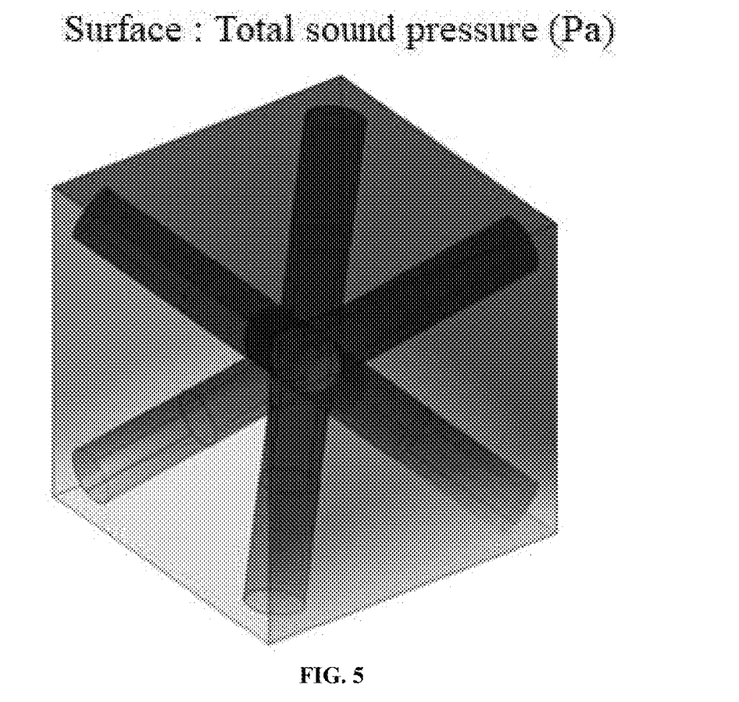
FIG. 5 is a surface sound pressure distribution diagram of sound absorption simulation of a solid BCC cell.
Figure 6:
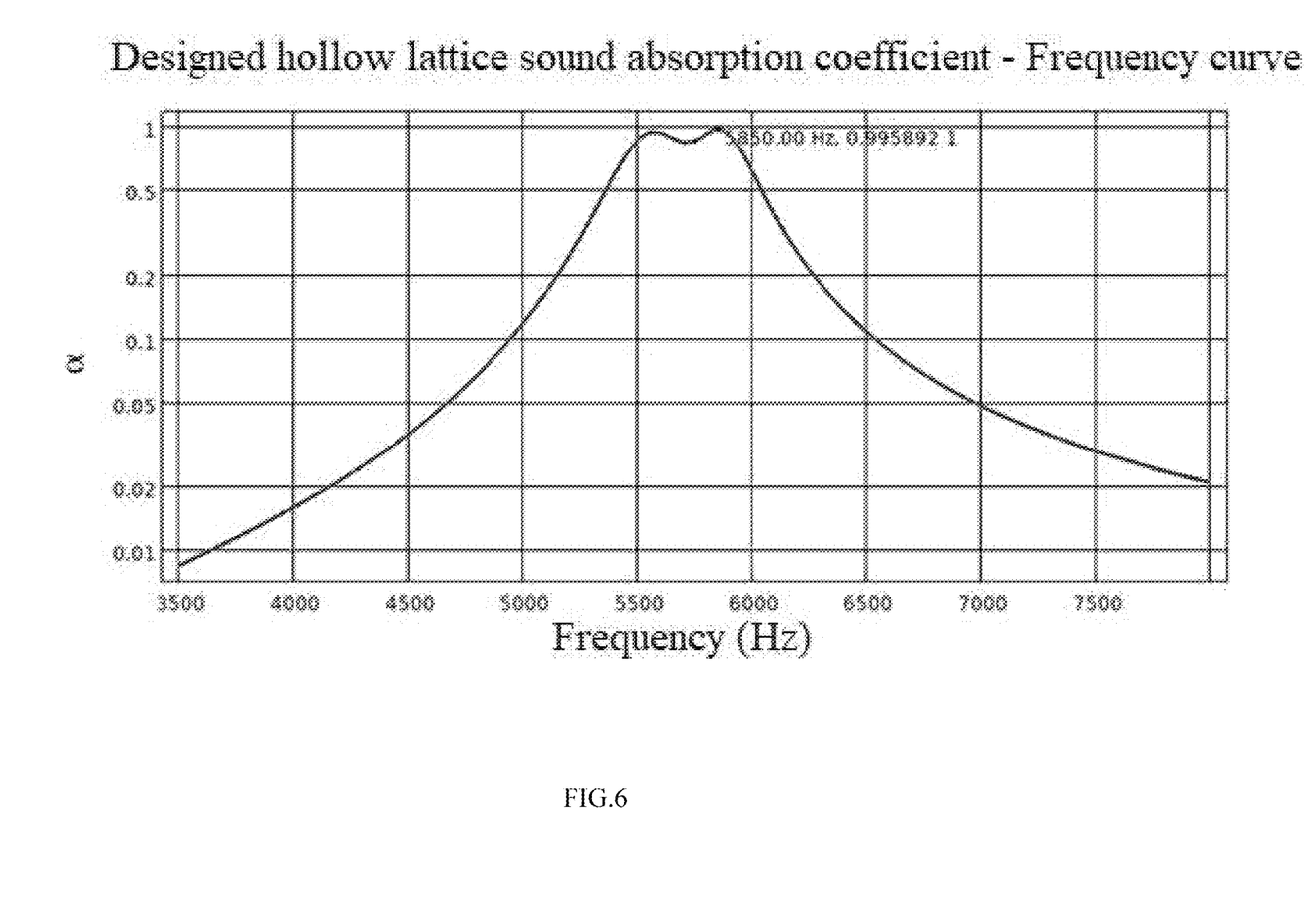
FIG. 6 is a schematic diagram of sound absorption coefficient-frequency curves in accordance with the present disclosure.

The above table shows the comparison of experimental data of the specific performance between the BCC structure with the cavity wall thickness of 0.6 to 1.2 mm and the traditional BCC structure with similar apparent density. It can be seen that compared with the traditional BCC structure, the BCC structure with cavity has 5% to 30% performance improvement in terms of specific energy absorption, specific strength and specific stiffness. The specific stiffness is the stiffness per unit density of a material, which is obtained by dividing the stiffness (modulus) of the material by the density of the material. The specific strength is the strength per unit density of the material, which is obtained by dividing the strength (yield stress) of the material by the density of the material. The specific energy absorption is the energy absorbed per unit mass, which is obtained by dividing the total absorbed energy when the energy absorption structure is completely crushed by the mass of the structure.

The above description is only the preferred embodiment of the present disclosure and the explanation of the applied technical principle. It should be understood by those skilled in the art that the inventive scope referred to in the present disclosure is not limited to technical solutions formed by specific combinations of the above technical features, but also covers other technical solutions formed by any combination of the above technical features or equivalents thereof without departing from the inventive concept. For example, the above features have similar functions to those disclosed in the present disclosure (but not limited to).

What is claimed is:

1. A sound absorption and load bearing integrated structure, comprised of first connecting nodes and holed hollow rods connected to the first connecting nodes, wherein the first connecting nodes are of solid structures, and connecting portions of the first connecting nodes and the holed hollow rods are in smooth transition by means of cambered surfaces,
   wherein the first connecting nodes and the holed hollow rods form sound absorption units,
   wherein a holed hollow rod of one of the sound absorption units axially extends forwards from corresponding one of the first connecting nodes, and extends to be connected to a first connecting node of another one of the sound absorption units, or extends to be intersected with a holed hollow rod of another one of the sound absorption units to form a second connecting node, wherein the number of the holed hollow rods connected to second connecting nodes is not greater than that of the holed hollow rods connected to the first connecting nodes, and wherein each of the holed hollow rods comprises a rod body, and a cavity formed in the rod body and with two closed ends, wherein the rod body is provided with a through hole communicating with the cavity, the through hole is located in an axial middle portion of the cavity, and the through hole forms a Helmholtz resonant cavity with the cavity, and wherein the cavity comprises of a cylindrical cavity, and the two ends of the cylindrical cavity are connected to hemispherical cavities or hemi-elliptical cavities.

2. The sound absorption and load bearing integrated structure according to claim 1, wherein the first connecting nodes and the holed hollow rods connected to the first connecting nodes form body-centered cubic cells, and connecting portions of the second connecting nodes and the holed hollow rods connected to the second connecting nodes are in smooth transition by means of cambered surfaces.

3. The sound absorption and load bearing integrated structure according to claim 2, wherein one side, away from the first connecting nodes, of each of the second connecting nodes located on the boundary of the sound absorption and load bearing integrated structure, is provided with a lead angle.

4. The sound absorption and load bearing integrated structure according to claim 1, wherein the rod body is cylindrical, and the rod body has a diameter of 2 to 6 mm and a length of 10 to 18 mm.

5. The sound absorption and load bearing integrated structure according to claim 1, wherein the through hole is a round hole and has a diameter of 0.2 to 1 mm.

6. The sound absorption and load bearing integrated structure according to claim 2, wherein each of the body-centered cubic cells comprises of eight holed hollow rods connected to each of the first connecting nodes.

7. The sound absorption and load bearing integrated structure according to claim 2, wherein the first connecting nodes forms a periodic structure with the holed hollow rods connected to the first connecting nodes.

8. The sound absorption and load bearing integrated structure according to claim 7, wherein the periodic structure is a centrosymmetric structure or an axisymmetric structure, and the outermost body-centered cubic cells are provided with holed hollow rods not connected to other body-centered cubic cells, wherein when the periodic structure is the centrosymmetric structure, the holed hollow rods not connected to the other body-centered cubic cells extend along a direction away from the symmetric center, or wherein when the periodic structure is the axisymmetric structure, the holed hollow rods not connected to the other body-centered cubic cells are located on the symmetric axis.

9. A preparation method of a sound absorption and load bearing integrated structure, comprising the following steps:

laying a layer of powder, and melting or sintering, by a laser beam, the powder according to a preset geometric shape;

after the powder is solidified, covering the next layer of powder over the solidified portion according to the preset geometric shape, and then performing laser melting or sintering; and accumulating and forming layer by layer to manufacture the sound absorption and load bearing integrated structure, comprised of first connecting nodes and holed hollow rods connected to the first connecting nodes, wherein the first connecting nodes are of solid structures, and connecting portions of the first connecting nodes and the holed hollow rods are in smooth transition by means of cambered surfaces, wherein the first connecting nodes and the holed hollow rods form sound absorption units, wherein a holed hollow rod of one of the sound absorption units axially extends forwards from corresponding one of the first connecting nodes, and extends to be connected to a first connecting node of another one of the sound absorption units, or extends to be intersected with a holed hollow rod of another one of the sound absorption units to form a second connecting node, wherein the number of the holed hollow rods connected to second connecting nodes is not greater than that of the holed hollow rods connected to the first connecting nodes, wherein each of the holed hollow rods comprises a rod body, and a cavity formed in the rod body and with two closed ends, wherein the rod body is provided with a through hole communicating with the cavity, the through hole is located in an axial middle portion of the cavity, and the through hole forms a Helmholtz resonant cavity with the cavity, wherein the cavity comprises of a cylindrical cavity, and the two ends of the cylindrical cavity are connected to hemispherical cavities or hemi-elliptical cavities, and wherein the air in the through hole and the air in the cavity form a co-vibration system and a vibration system composed of an effective mass of air in the through hole and the air in the cavity has a resonance phenomenon for the action of sound waves, with the resonance frequency of $$f_0 = \frac{c}{2\pi}\sqrt{\frac{S}{(l+0.8d)V}},$$

wherein $f_0$ is the resonance frequency of a Helmholtz resonator, c is the sound velocity, l and d are the length and diameter of the through hole, S is the cross-sectional area of the through hole, and V is the volume of the cavity.

* * * * *